United States Patent [19]
Rhudy et al.

[11] 3,734,183
[45] May 22, 1973

[54] POLYMER FLOODING OBTAINED BY PULSE INJECTION

[75] Inventors: John S. Rhudy, Denver; James H. Fullinwider, Adams; David J. Ver Steeg, Arapahoe, all of Colo.

[73] Assignee: Marathon Oil Company, Findlay, Ohio

[22] Filed: June 24, 1971

[21] Appl. No.: 156,273

[52] U.S. Cl. .................. 166/263, 166/273, 166/275
[51] Int. Cl. ........................................... E21b 43/22
[58] Field of Search ............... 166/273–275, 268, 263

[56] References Cited

UNITED STATES PATENTS

| | | |
|---|---|---|
| 3,279,537 | 10/1966 | Kirk, Jr. et al............................166/274 |
| 3,500,919 | 3/1970 | Holm.........................................166/273 |
| 3,039,529 | 6/1962 | McKennon..............................166/275 |
| 3,367,418 | 2/1968 | Routson ..................................166/274 |
| 2,827,964 | 3/1958 | Sandiford et al. ......................166/274 |
| 3,308,883 | 3/1967 | Foster .....................................166/275 |
| 3,638,729 | 2/1972 | Parker.....................................166/273 |
| 3,506,070 | 4/1970 | Jones.......................................166/273 |
| 3,497,006 | 2/1970 | Jones et al..............................166/273 |
| 3,406,754 | 10/1968 | Gogarty..................................166/273 |

Primary Examiner—Stephen J. Novosad
Attorney—Joseph C. Herring et al.

[57] ABSTRACT

Secondary and tertiary recovery of crude oil via polymer injection is improved by injecting the polymer in a pulsating manner. This intermittently relieves the formation injection pressure, thereby releasing polymer entrapped in the sandstone matrix. This released polymer is effective in helping maintain mobility control throughout the completion of the polymer flood.

10 Claims, 1 Drawing Figure

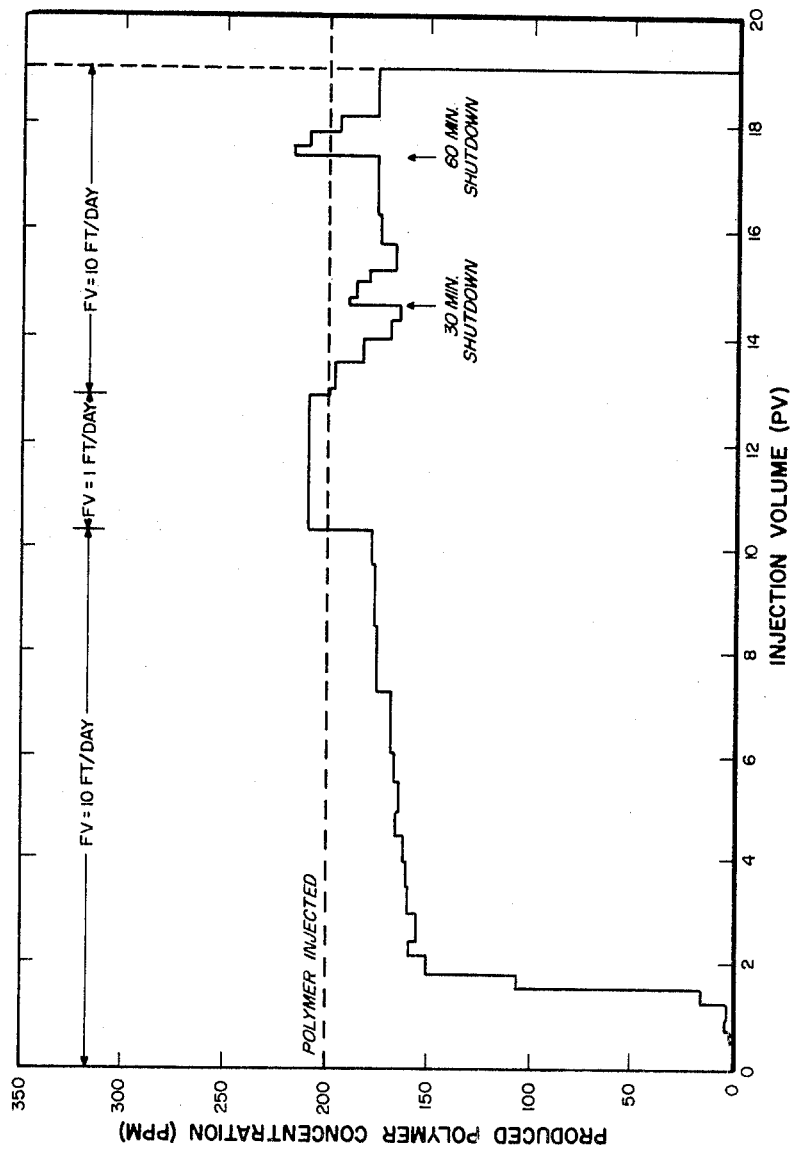

3,734,183

POLYMER FLOODING OBTAINED BY PULSE INJECTION

BACKGROUND OF THE INVENTION

1. Field of the Invention

This invention relates to the secondary and tertiary recovery of oil wherein polymer is injected, and more specifically wherein entrapped polymer is released during the course of the flood.

2. Description of the Prior Art

Secondary and tertiary recovery of oil by injection of a polymer solution into a subterranean oil-bearing formation through an injection well in fluid communication with a producing well is a well-known process.

U. S. Pat. No. 2,827,964 to Sandiford teaches a secondary recovery process in which a viscous aqueous solution of water-soluble partially hydrolyzed polyacrylamide is injected into an injection well and forced through the formation toward a production well.

U. S. Pat. No. 3,039,529 to McKennon teaches the use of about 100 to about 5,000 ppm high molecular weight partially hydrolyzed polyacrylamide solution to improve flooding for recovery of crude oil.

U. S. Pat. No. 3,282,337 to Pye teaches the use of dilute and comparatively non-viscous water soluble polymers in secondary recovery.

Due to its molecular size and character, polymer is physically entrapped in the sandstone matrix of the reservoir as the flood proceeds. This accounts for the desirable mobility reducing characteristic of the polymer. However, as more and more polymer is entrapped and consequently removed from flow, the mobility of the leading edge of the polymer bank gradually increases. This increases the probability of fingering, and hence bypassing of portions of the reservoir oil.

SUMMARY OF THE INVENTION

This invention increases the effectiveness of polymer solutions used for mobility control by forcing a large proportion of the polymer to remain within the "polymer bank," thereby maintaining relatively low mobility at the leading edge of the bank. This is accomplished by injecting the polymer in a pulsating manner, e. g., intermittently stopping polymer injection, thereby relieving the formation pressure. This allows a portion of the polymer which has already been entrapped in the formation matrix to re-enter the flow pattern, and be "reused," by being entrapped again, near the leading edge of the polymer bank. This also permits a reduction in injection pressure since the mobility of the trailing edge of the polymer bank is increased.

BRIEF DESCRIPTION OF THE DRAWING

The FIGURE is a graphic representation illustrating a process for releasing entrapped polymer via pulsating injection. A detailed explanation is provided in Example I.

DESCRIPTION OF THE INVENTION

Preferred polymers useful with this invention include high molecular weight polyelectrolytes, specifically high molecular weight polyacrylamides and partially hydrolyzed products thereof, sulfonated high molecular weight polymers, chemically modified polymers such as carboxymethylcellulose, polysaccharides, and like polymers. Essentially any polymer which is water soluble and possesses adequate mobility reducing characteristics can be used.

The term "pulsating" as used herein is intended to mean the intermittent reduction of the polymer solution injection pressure. Hence, these reductions in pressure may occur periodically or sporadically. This pressure reduction can be accomplished by varying the injection pressure, stopping polymer solution injection altogether, or by merely reducing the injection rate.

The term "polymer bank" as used herein is intended to mean the mass of polymer solution moving through the formation. Hence when polymer molecules become entrapped in the formation, they are removed from the polymer bank; and when these molecules are released from the formation, they re-enter the polymer bank. After these molecules reenter the polymer bank, they can be "reused" by once again becoming entrapped.

The formation matrix best suited for this invention is a sandstone matrix. However, a carbonate matrix is also accommodating, along with any matrix which tends to entrap polymer.

In addition to the standard polymer flooding processes, this invention may be used in conjunction with micellar dispersion flooding. Micellar dispersion flooding, along with micellar dispersions in general, are discussed in U. S. Pat. Nos. 3,254,714; 3,497,006; and 3,506,070.

Generally micellar dispersion flooding is carried out much the same way as waterflooding. A micellar dispersion is first injected into the formation, and then driven through the formation toward a production means by a drive medium, e.g., water. It is quite advantageous to inject a "mobility buffer" between the micellar dispersion and the drive medium to overcome the problems encountered due to the relatively large difference in mobilities. Since this mobility buffer is preferably a polymer solution, a polymer retention problem in the polymer bank is again encountered.

The following example teaches preferred embodiments of the invention:

EXAMPLE I

A ceramic core plug (manufactured by the Coors Porcelain Co., Golden, Colorado, U.S.A.) 3 ¼ inches long and 1 inch in diameter is flooded with water to determine initial permeability. A 200 ppm Dow 500 Pusher polymer solution (a partially hydrolyzed polyacrylamide) is then injected. The fluids exiting the core plug are collected to measure the produced polymer concentration, and this is plotted against Injection Volume in the Figure. Polymer concentration is determined by measuring the organic carbon concentration by means of a Beckman Model 915 Total Organic Carbon Analyzer. After 10.3 pore volumes of polymer is injected at ten feet per day, the effluent polymer concentration stabilizes at about 178 ppm (89 percent of injected polymer concentration). The injection rate is then decreased to 1 foot per day, resulting in an effluent polymer concentration of 210 ppm. Hence, more polymer is now being produced than is injected, indicating that polymer which had previously been lost due to entrapment is now being released at the reduced injection rate.

The rate is then returned to 10 feet per day for 1.6 pore volumes injection with a corresponding reduction in polymer concentration to 165 ppm. At this point the injection is halted for 30 minutes, followed by the injection of 2.8 pore volumes at 10 feet per day. The effluent polymer concentration immediately measures 190 ppm which then decreases to 176 ppm. It is noted that immediately following shutdown, polymer which had been entrapped in the matrix is released. At this juncture the injection is ceased for 60 minutes and then again returned to 10 feet per day. Immediately following the shutdown the effluent polymer concentration is 218 ppm, and this gradually decreases to 175 ppm through the injection of 1.7 pore volumes. Hence, a substantial amount of entrapped polymer is released during the 60 minute shutdown.

The FIGURE illustrates this process by means of a plot of Produced Polymer Concentration (measured as ppm, or parts per million) vs. Injection Volume (measured as PV or pore volume). The horizontal dashed line at 200 ppm produced polymer concentration provides a comparison of polymer injection with polymer production for each of the events of this example. The flow velocity is designated as "FV" in this FIGURE.

It should be understood that the invention is capable of a variety of modifications and variations which will be made apparent to those skilled in the art by a reading of the specification and which are to be included within the spirit of the claims appended thereto.

For example, polymer solutions which contain surfactants, or other additives, are enhanced with this injection technique.

What is claimed is:

1. In a process for producing formation fluids from an oil-bearing subterranean reservoir having at least one injection means in fluid communication with at least one production means comprising injecting a polymer solution possessing mobility reducing characteristics into the formation to drive the formation fluids toward the production means, the mobility reducing characteristics caused primarily by polymer entrapment in the formation, the improvement comprising injecting the polymer solution in a pulsating manner to intermittently stop the injection of the polymer, thereby releasing entrapped polymer and allowing this polymer to reenter the polymer solution.

2. The process of claim 1 wherein the polymer solution is a high molecular weight polyelectrolyte.

3. The process of claim 1 wherein the polymer solution is a high molecular weight polyacrylamide.

4. The process of claim 1 wherein the polymer solution comprises a partially hydrolyzed polyacrylamide.

5. In a process for producing formation fluids from an oil-bearing subterranean reservoir having at least one injection means in fluid communication with at least one production means the process comprising injecting a micellar dispersion into the formation followed by a mobility buffer and a drive medium, the improvement comprising injecting the mobility buffer in a pulsating manner to intermittently stop the injection of the mobility buffer, thereby releasing entrapped polymer from the mobility buffer and allowing this polymer to reenter the mobility buffer solution and thereby effecting more efficient mobility control for the process.

6. The process of claim 5 wherein the mobility buffer comprises a polymer solution.

7. The process of claim 5 wherein the drive medium is water.

8. The process of claim 5 wherein the mobility buffer comprises a high molecular weight polyelectrolyte.

9. The process of claim 5 wherein the mobility buffer is comprises of a high molecular weight polyacrylamide.

10. The process of claim 5 wherein the mobility buffer is comprised of a partially hydrolyzed, high molecular weight polyacrylamide.

* * * * *